(12) United States Patent
Lippmann et al.

(10) Patent No.: US 7,070,750 B2
(45) Date of Patent: Jul. 4, 2006

(54) MULTIPLE-PRESSURE PROCESS FOR THE PRODUCTION OF AMMONIA

(75) Inventors: Dennis Lippmann, Dortmund (DE); John Skaanderup-Larsen, Santa Fe, TX (US)

(73) Assignee: Uhde GmbH, Dortmund (DE)

( * ) Notice: Subject to any disclaimer, the term of this patent is extended or adjusted under 35 U.S.C. 154(b) by 281 days.

(21) Appl. No.: 10/416,131

(22) PCT Filed: Oct. 11, 2001

(86) PCT No.: PCT/EP01/11750

§ 371 (c)(1),
(2), (4) Date: Sep. 12, 2003

(87) PCT Pub. No.: WO02/42209

PCT Pub. Date: May 30, 2002

(65) Prior Publication Data
US 2004/0042951 A1    Mar. 4, 2004

(30) Foreign Application Priority Data
Nov. 21, 2000 (DE) ................................. 100 57 863

(51) Int. Cl.
*C01C 1/04* (2006.01)
(52) U.S. Cl. ..................................... 423/359; 423/362
(58) Field of Classification Search ................ 423/359, 423/361, 362
See application file for complete search history.

(56) References Cited

U.S. PATENT DOCUMENTS

| | | | | |
|---|---|---|---|---|
| 1,931,678 A | * | 10/1933 | Porter | 423/361 |
| 2,046,478 A | * | 7/1936 | O'Leary | 423/361 |
| 4,568,530 A | * | 2/1986 | Mandelik et al. | 423/359 |
| 4,568,531 A | * | 2/1986 | van Dijk et al. | 423/361 |
| 4,568,532 A | * | 2/1986 | Benner et al. | 423/361 |
| 4,780,298 A | | 10/1988 | Kowal | |
| 4,789,538 A | * | 12/1988 | Cirjak et al. | 423/362 |
| 5,484,582 A | * | 1/1996 | Lee | 423/359 |
| 5,846,507 A | * | 12/1998 | Liu et al. | 423/362 |
| 5,997,834 A | * | 12/1999 | Udengaard et al. | 423/361 |

FOREIGN PATENT DOCUMENTS

| | | |
|---|---|---|
| DE | 29 39 816 A1 | 5/1981 |
| EP | 0 093 502 A1 | 11/1983 |
| EP | 0 179 392 A2 | 4/1986 |

* cited by examiner

*Primary Examiner*—Wayne A. Langel
(74) *Attorney, Agent, or Firm*—Marshall & Melhorn

(57) ABSTRACT

The invention relates to a process for the production of ammonia from synthesis gas, the synthesis of ammonia from synthesis gas taking place in several lined-up synthesis systems, whereby ammonia is produced from a portion of the synthesis gas in each system with a part-stream being withdrawn and the respective downstream synthesis system being operated at a higher pressure than the respective upstream synthesis system.

10 Claims, 3 Drawing Sheets

MULTIPLE-PRESSURE PROCESS FOR THE PRODUCTION OF AMMONIA

BACKGROUND OF THE INVENTION

The invention relates to a process for the production of ammonia $NH_3$ under pressure from synthesis gas according to the reaction (1):

$$3\ H_2 + N_2 \rightarrow 2\ NH_3 \quad (1)$$

which contains the reactants hydrogen $H_2$ and nitrogen $N_2$ as well as ingredients which are usually inert to reaction (1) such as methane and noble gases which impede the conversion rate of the reaction (1) and which will hereafter be referred to as "inert ingredients". Processes of this type are usually operated in such a way that the make-up gas is first compressed in several stages to a high pressure and the compressed make-up gas then fed to a loop which encompasses one or more reactors filled with catalysts to produce ammonia. The loop is provided with an outlet to withdraw liquid ammonia which has been produced.

In order to avoid an enrichment in the loop of the inert ingredients which are contained in the withdrawn ammonia and which are only soluble at very low concentrations, a partstream of the gases circulated in the loop is continuously withdrawn as purge gas. The residual ammonia is removed from this purge gas by scrubbing, the hydrogen and the nitrogen, if any, being removed and recovered by using membrane technology or low-temperature separation. The residual inert ingredients such as methane, argon, helium and residual nitrogen, if any, are discharged or otherwise used for heating purposes. The recycle gas is added to the make-up gas before it is compressed and thus re-used. It is detrimental to the energy balance to withdraw large amounts of purge gas from the loop since this would cause a significant drop in pressure for large volumes of gas which must then undergo secondary compression with much expenditure incurred.

This is the reason why the enrichment of the inert ingredients from an original value of 1 to 2% by volume in the make-up gas up to 10 or 20% by volume cannot be avoided within the recycle gas, even though there is the inevitable disadvantage associated with these high inerts concentrations that the partial pressure of the gases participating in the reaction, which alone are crucial for the state of the reaction equilibrium as affinity to the reaction, are significantly lower than they would be in a completely inerts-free synthesis gas loop. This is the reason why the volume of the catalysts used and the reactors which house them must be significantly larger than would be required without the presence of inert ingredients in the synthesis gas loop.

The enrichment of inert ingredients in the loop compared to the original level of concentration in the make-up gas, which is tolerated despite the disadvantages described above, demonstrates the technical paradox which arises in that the operating costs, particularly the compression costs, decrease in the presence of smaller amounts of purge gas and thus of higher concentrations of inert ingredients, while the capital costs increase due to the larger catalyst volumes required, or the need of using alternatively more expensive catalysts such as those based on ruthenium. This technical paradox cannot be resolved using current state-of-the-art technologies. The specialist in this field is thus compelled to find a compromise and to establish the optimum cost balance in respect of high operational expenditure and capital cost.

The synthesis taking place in the reactor yields product gas from the synthesis gas. It primarily consists of the unreacted portion of the feed gas, the ammonia formed and the inert ingredients. The ammonia is gaseous at the reactor outlet but it must be condensed so that it can be separated from the product gas and be withdrawn as liquid ammonia from the loop. Since the dew point of ammonia depends on its partial pressure and its temperature, it is an advantage to the condensation of the product to provide a higher synthesis pressure and a high ammonia concentration on the one hand, while having a lower temperature on the other. A high ammonia concentration can be obtained by using large catalyst volumes at low inerts concentrations. A high synthesis pressure leads to a correspondingly higher cost of energy required to compress the synthesis gas and a lower cooling temperature demands that an appropriate cooling apparatus be installed in the recycle gas.

A working synthesis pressure of between 150 and 280 bar is usually selected to provide cooling for the ammonia produced in the loop by means of heat transfer systems, water or air cooling and/or additional cooling circuits, and they are combined in such a way that the ammonia condenses and can thus be withdrawn in the liquid phase. This relatively high pressure has the advantage that a large portion of the ammonia already condenses at relatively high temperatures such as those that can be achieved by water cooling (e.g. cooling down to 30–40° C.). For example, the dew point of a product concentration of 20 molar % at a 200 bar synthesis pressure equals about 57° C. A water cooling system rated for 35° C., for example, allows the ammonia content in the gas to be lowered to 11.2 molar % and thus permits a recovery of 59% of the condensable product portion. The fact that the recycle gas returned to the reactor should have as low an ammonia concentration as possible (in our example 3.8 molar %) necessitates, as a rule, the downstream installation of an additional refrigeration circuit using water in order to make an even larger part of the product condense at even lower temperatures (e.g. cooling down to a temperature of between –10° C. and 0° C.). This refrigeration circuit requires energy to recompress the vaporised refrigerant. The portion of the product which requires condensation through refrigeration is small when applying the above-mentioned synthesis pressures, which means that a correspondingly small amount of energy is required for the refrigerant compressor.

These above facts reveal the reasons why the specialist in the field normally tends to maintain the working synthesis pressure between 150 and 280 bar but exceptions are known in which the synthesis pressure was reduced to 60 bar. Patents EP 000 993, EP 093 502 and EP 179 392 describe such configurations. Since the volume of conventional magnetite catalysts would grow disproportionately if the synthesis pressure were lowered and since this also applies to the constructional requirements for the reactors, the processes described use highly active catalysts. Magnetite catalysts doped with cobalt are still required in large amounts, the ruthenium catalyst being more expensive because of its noble metal content.

The lower the synthesis pressure the lower the amount of heat which can be dissipated by using water or air cooling and consequently the portion of heat to be removed by refrigeration increases accordingly. This leads to a further technical paradox if one considers, as in standard practice, that the refrigeration requires a cooling circuit with a compressor set. While the compression expenditure for the synthesis loop declines as the synthesis pressure decreases, the compression expenditure for the cooling circuit increases since more refrigeration is required to withdraw the ammonia produced in the synthesis loop. The portion of ammonia condensed prior to refrigeration is increased in low-pressure processes in that a very low concentration of inert ingredients is set by means of a high flow rate of the purge gas stream. The problem with the enrichment of inert ingredients occurs as in the high-pressure synthesis process and a lower inerts concentration increases the product concentration and consequently the dew point. Hence, the specialist in the field must in this case, too, find a compromise and establish an optimum cost balance in respect of high operational expenditure and investment costs.

For many years commercial scale production of ammonia has been undertaken in large single-train plants. The single-train concept is the result of the high costs associated with a loop operated at high pressure and of the high costs for the compression process, which both are subject to high degression with increasing flow rates. Hence, some sort of technical prejudice has been held for many years according to which the economical production of ammonia is feasible only in single-train chemical plants.

Only few attempts have been made to add another train to such a single-train plant as, for instance, described in DD 225 029. This document describes two high-pressure synthesis units arranged one after the other and operated at the same pressure levels, the first being a make-up gas system and the second a conventional loop system, the aim of said concept being to reduce the amount of ammonia produced in the loop by the amount produced in the upstream make-up gas system in order to reduce the loop volumes accordingly. The system has not been able to find acceptance on the market over the last 20 years, a fact which appeared to confirm the existing prejudice that only single-train plants can operate economically. Moreover, the said technical paradoxes also apply in full to the reaction system described in DD 225 029.

SUMMARY OF THE INVENTION

The aim of the invention, therefore, is to overcome the above-mentioned disadvantages and to offer a cost-effective process for the production of ammonia.

The aim of the invention is achieved by providing for a synthesis of ammonia from synthesis gas in several synthesis systems lined-up, whereby ammonia is produced from a portion of the synthesis gas in each system with a part-stream being withdrawn and the respective downstream synthesis system operating at a higher pressure than the respective upstream synthesis system. In this context, a synthesis system is understood to mean a reaction system which consists of a reactor and a device for separating the ammonia produced. Higher pressure is understood to mean a differential pressure which exceeds the pressure losses within the synthesis system.

In a further embodiment of the invention, the first synthesis system operates as a make-up gas system.

In a further embodiment of the invention, all synthesis systems operate as make-up gas systems with the exception of the last synthesis system.

In a further embodiment of the invention, the last synthesis system operates as a loop system.

In a further embodiment of the invention, each synthesis system is separated from the next downstream synthesis system by at least one compression stage.

In a further embodiment of the invention, a stream of purge gas withdrawn from a synthesis system with a higher pressure is sent as feedstock to a synthesis system operating at a lower pressure, the inert ingredients, ammonia and various other gas ingredients having been removed before.

In a further embodiment of the invention, the purge gas stream flow rate is increased such that the enrichment with inert ingredients within the system operated at the highest pressure reaches a max. value of 10 molar %.

In a further embodiment of the invention, catalyst material containing magnetite with promoters for low-pressure synthesis systems is used in at least one make-up gas reactor.

A further embodiment of the invention provides for the use of catalyst material in at least one make-up gas reactor, said catalyst containing noble metal such as ruthenium and being highly active.

BRIEF DESCRIPTION OF THE DRAWINGS

The invention will now be illustrated in detail taking four process flow diagrams as an example.

To facilitate the understanding of the essence of the invention, neither the interconnected heat system nor the mechanical connections of the individual compressor stages with the numbers involved are represented in said sketches.

DESCRIPTION OF THE PREFERRED EMBODIMENTS

Figure 1:
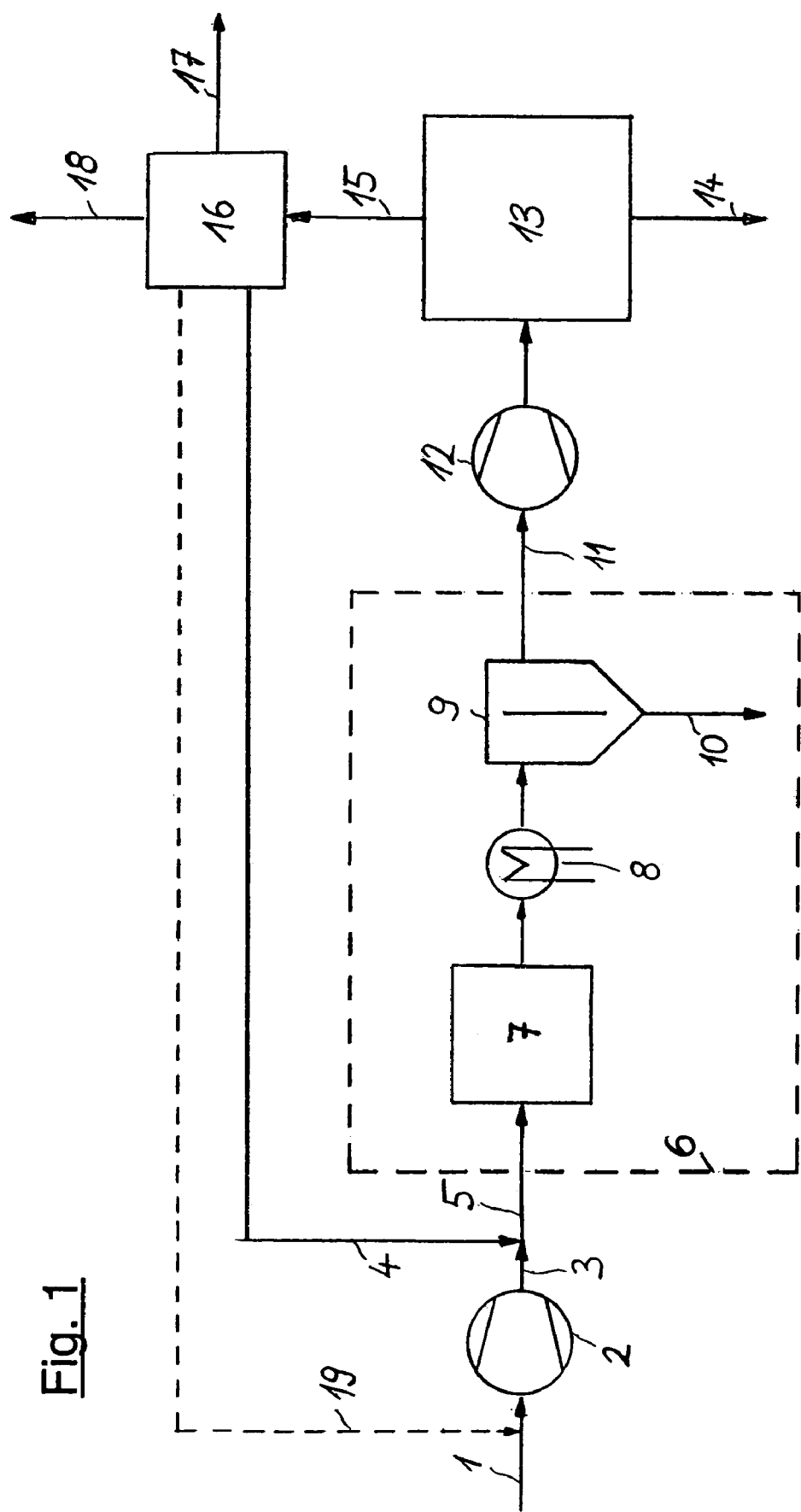
FIG. 1: an embodiment of the invention showing one synthesis system operated at lower pressure and one synthesis system operated at higher pressure.

FIG. 1 shows that make-up gas stream 1 is compressed in a primary compression stage 2 to approx. 60 to 130 bar, preferably 90 to 115 bar, unless make-up gas stream 1 is not already fed at this pressure from the synthesis gas plant normally located upstream. Recycle gas stream 4 is admixed to primary-compressed synthesis gas stream 3. Synthesis gas stream 5 thus obtained is first used in primary synthesis system 6 operated at low pressure. Here it flows successively through makeup gas reactor 7 for the synthesis of ammonia, which may also consist of several individual reactors, then through cooling and condensation section 8, in which the ammonia obtained condenses at a lower temperature, and then said gas enters ammonia separator 9 to separate, as liquid ammonia 10, the ammonia removed by condensation from the gas phase. It is known that the ammonia synthesis in make-up gas reactor 7 is an incomplete process because of the reaction conditions, and therefore only a part of make-up gas stream 1 is consumed in make-up gas reactor 7. Residual synthesis gas stream 11 which leaves ammonia separator 9 is fed to secondary compression unit 12 to obtain the pressure required for feeding it to secondary synthesis system 13 operated at a high pressure of approx. 150 to 280 bar.

In secondary synthesis system 13, the ammonia synthesis takes place in a conventional state-of-the-art loop system, the ammonia produced being withdrawn as liquid ammonia 14. Purge gas stream 15 is continuously withdrawn in order to limit the enrichment with inert ingredients. Purge gas stream 15 is first processed in recovery unit 16 to remove the ammonia thus obtained as liquid ammonia 17. Then the inert ingredients and the nitrogen, if any, are separated from the valuable hydrogen. The hydrogen recovered in this way is returned to the process as recycle gas stream 4. Instead of arranging for admixing as shown in FIG. 1 downstream of primary compression stage 2, it may also be useful to provide for recycle stream 19 upstream of primary compression stage 2 (shown as broken line), depending on the pressure at which the recycle stream is discharged from recovery unit 16. It is of course also possible to operate both admixing systems in parallel as, for example, in the case of multiple-stage gas separation within recovery unit 16. Depending on the design of recovery unit 16, it is possible to recover also nitrogen in addition to hydrogen. The recycling method has the advantage that a smaller quantity of make-up gas stream 1 needs to be produced, which constitutes a particular advantage in view of the amount of energy and scope of equipment to be provided for the generation of hydrogen.

The residual gases separated in recovery unit 16, primarily methane and noble gases but also nitrogen, if any, are recovered from the process as inert gas removal stream 18 and can be further utilised as energetic and exergetic source.

The technical paradox concerning, on the one hand, acceptance of the enrichment with inert ingredients in the loop of the high-pressure synthesis system and, on the other, the increased costs for providing secondary compression does no longer exist in this case when the whole recycle gas stream 4 recovered from the purge gas in recovery unit 16 can be returned to a synthesis system operating at a lower pressure, hence without the necessity of providing a secondary compression, which constitutes an advantage of the invention. It is therefore no problem to reduce more efficiently the enrichment with inert ingredients in the loop system.

When comparing a conventional high-pressure ammonia synthesis with a high-pressure synthesis system of the same capacity and designed according to this invention, it becomes obvious that the high-pressure synthesis system described in this invention permits a substantially higher efficiency when operated at the same synthesis pressure, since the lower concentration of inert ingredients significantly reduces the required catalyst volumes, increases the partial pressure of the ammonia at the reactor outlet and consequently also shifts the ammonia dew point, reduces the amount of refrigerant required to condense the ammonia produced and finally, as a result of the smaller overall volume of recycle gas, diminishes the expenditure necessary to sustain the recycle gas loop, the said features constituting advantages of this invention.

A comparison of conventional low-pressure ammonia synthesis systems with the low-pressure ammonia synthesis system designed according to the invention reveals the advantage of this invention that the thermodynamic reaction conditions are more favourable since the concentration of inert ingredients in this case is also very low due to the make-up gas processing, and even if several make-up gas systems are lined up, the content of inert ingredients only rises slightly from one system to the next. Hence, these sections of the plant also require smaller catalyst volumes, or alternatively, a ratio of highly active to standard catalysts that is lower than hitherto needed, which constitutes an advantage of the invention. It is, for example, possible to improve the efficiency by using smaller amounts of highly active, enhanced magnetite catalysts with promoters for low pressure as well as noble metal catalysts such as those based on ruthenium. This also includes nitrides of sub-group numbers VI and VIII in the periodic table of the elements.

A further advantage of the invention consists in the possibility of providing very large plant capacities using conventional sizes of equipment and splitting the production between several synthesis systems, so that there is no need to accept the detriments which normally occur when switching from a single-train to a multiple-train concept. The components of a conventional high-pressure ammonia synthesis plant, which are critical to the size, are as a rule the synthesis gas compressor and the hot apparatus for the high-pressure synthesis loop. These systems are to some extent subjected to lower loads in configurations according to this invention, since the second stage of the synthesis gas compressor must only perform a secondary compression of a certain part of the total synthesis gas volume, i.e. the part not converted into product and not condensed in the low-pressure system. Furthermore, the lower content of inert ingredients in the high-pressure synthesis loop produces the effect that the high-pressure synthesis loop can be smaller in size for the same production output as that of a plant with just one reaction system. Instead of building a smaller plant right from the beginning, the favourable features involved can be exploited to provide an accordingly higher plant capacity.

Figure 2:
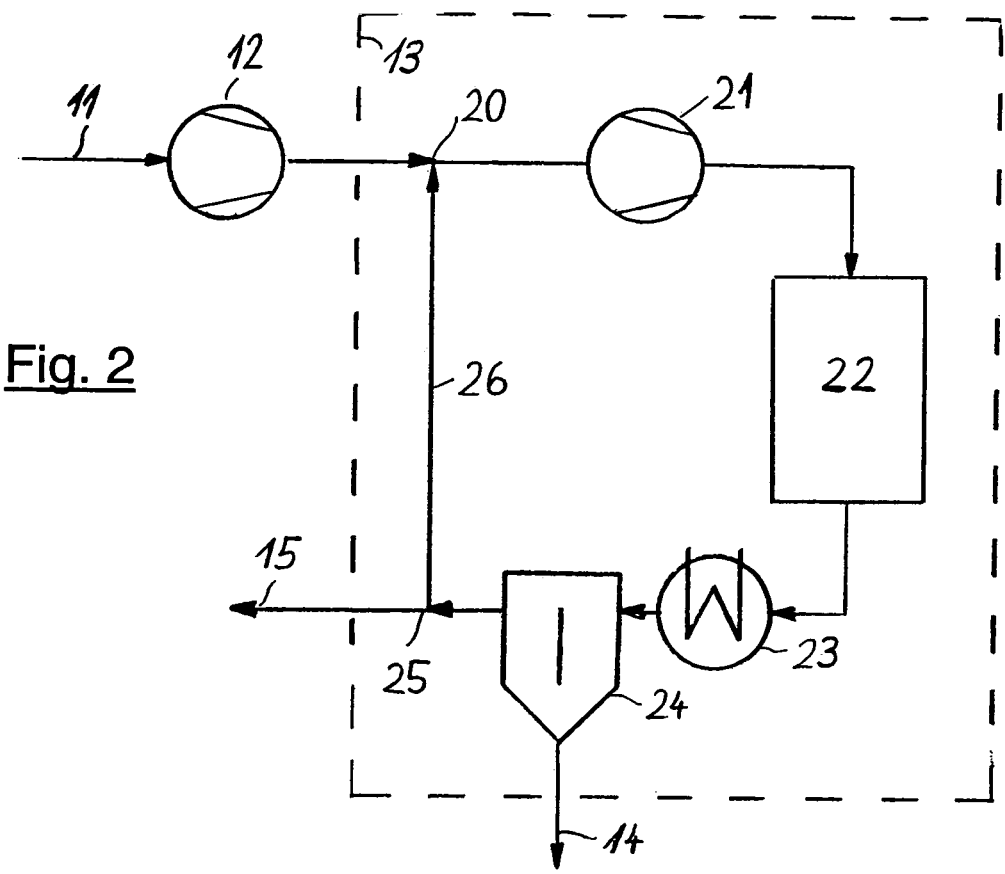
FIG. 2: an advantageous tie-in of the feed gas stream withdrawn from the low-pressure synthesis system and fed to the high-pressure synthesis system, a concept suitable for new plants or plant revamps.

FIG. 2 illustrates a possibility of integrating, upon the secondary compression in unit 12, residual synthesis gas stream 11 into secondary synthesis system 13 (shown as broken line), preferably when building a new plant. In this case, the synthesis gas leaving secondary compression unit 12 is fed to the loop at a point downstream of ammonia separation unit 24, but upstream of ammonia reactor 22, as a rule directly upstream of recycle compression unit 21. But it is also possible, as distinct from the way shown in FIG. 2, to arrange synthesis gas feed point 20 downstream of recycle compression unit 21. The pressure losses caused by the individual process steps within the loop system are compensated by recycle compression unit 21, downstream of which are located ammonia reactor 22, usually consisting of several sections with intermediate cooling, cooling and condensation section 23 for the ammonia produced and ammonia separation unit 24, in which liquid ammonia 14 is obtained. Purge gas withdrawal point 25 is arranged in the section with the highest concentration of inert ingredients at low temperature, which facilitates the subsequent separation of the residual ammonia in recovery unit 16 (see FIG. 1). Residual recycle gas 26 is fed to synthesis gas feed point 20 which completes the loop.

Figure 3:
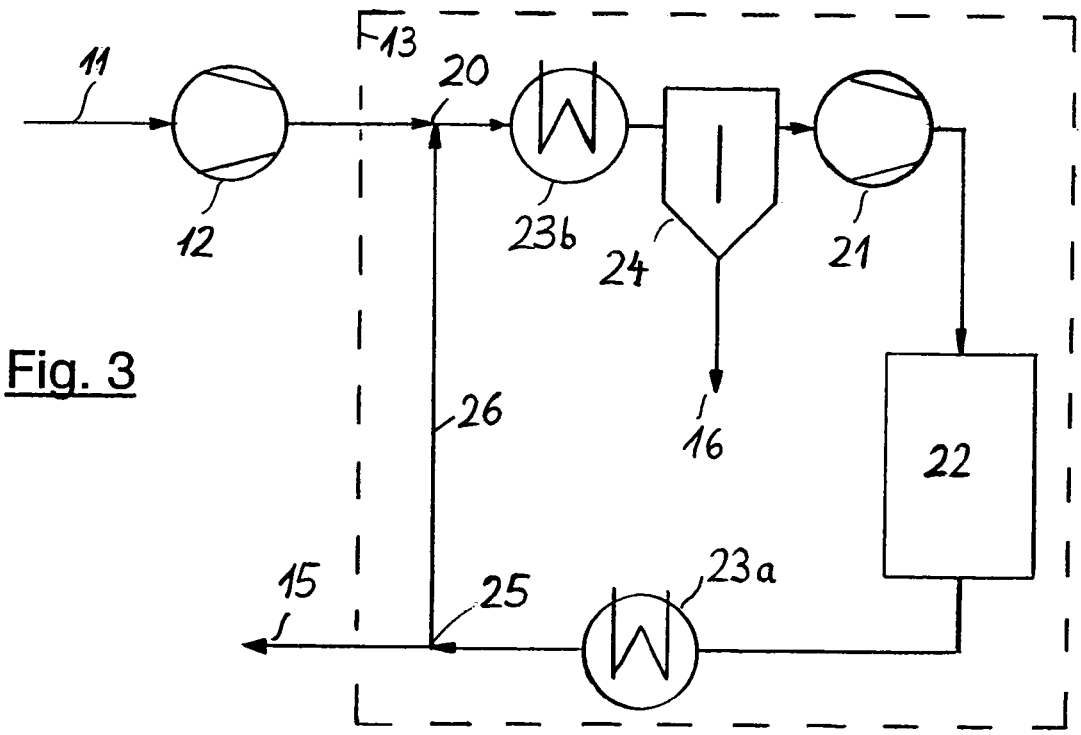
FIG. 3: an alternative concept for tying in the feed gas stream withdrawn from the low-pressure synthesis system and fed to the high-pressure synthesis system, a concept suitable for new plants or plant revamps.

FIG. 3 illustrates a further possibility of integrating, upon the secondary compression in unit 12, residual synthesis gas stream 11 into secondary synthesis system 13 (shown as broken line), both for a new plant concept as well as for an existing plant operated at high pressure. Here, the synthesis gas re-compressed in unit 12 is fed to a point located between the high-pressure reaction system and the product separation. In existing plants, synthesis gas feed point 20 is usually located in or downstream of cooling and condensation section 23a or 23b, but upstream of ammonia separation unit 24. The pressure losses caused by the individual process steps within the loop system are compensated in downstream recycle compression unit 21. Downstream of said unit 21 there is ammonia reactor 22 which usually consists of several sections with intermediate cooling. Purge gas withdrawal point 25 is also located in the section with the highest concentration of inert ingredients. Residual recycle gas 26 is fed to synthesis gas feed point 20 which completes the loop.

Figure 4:
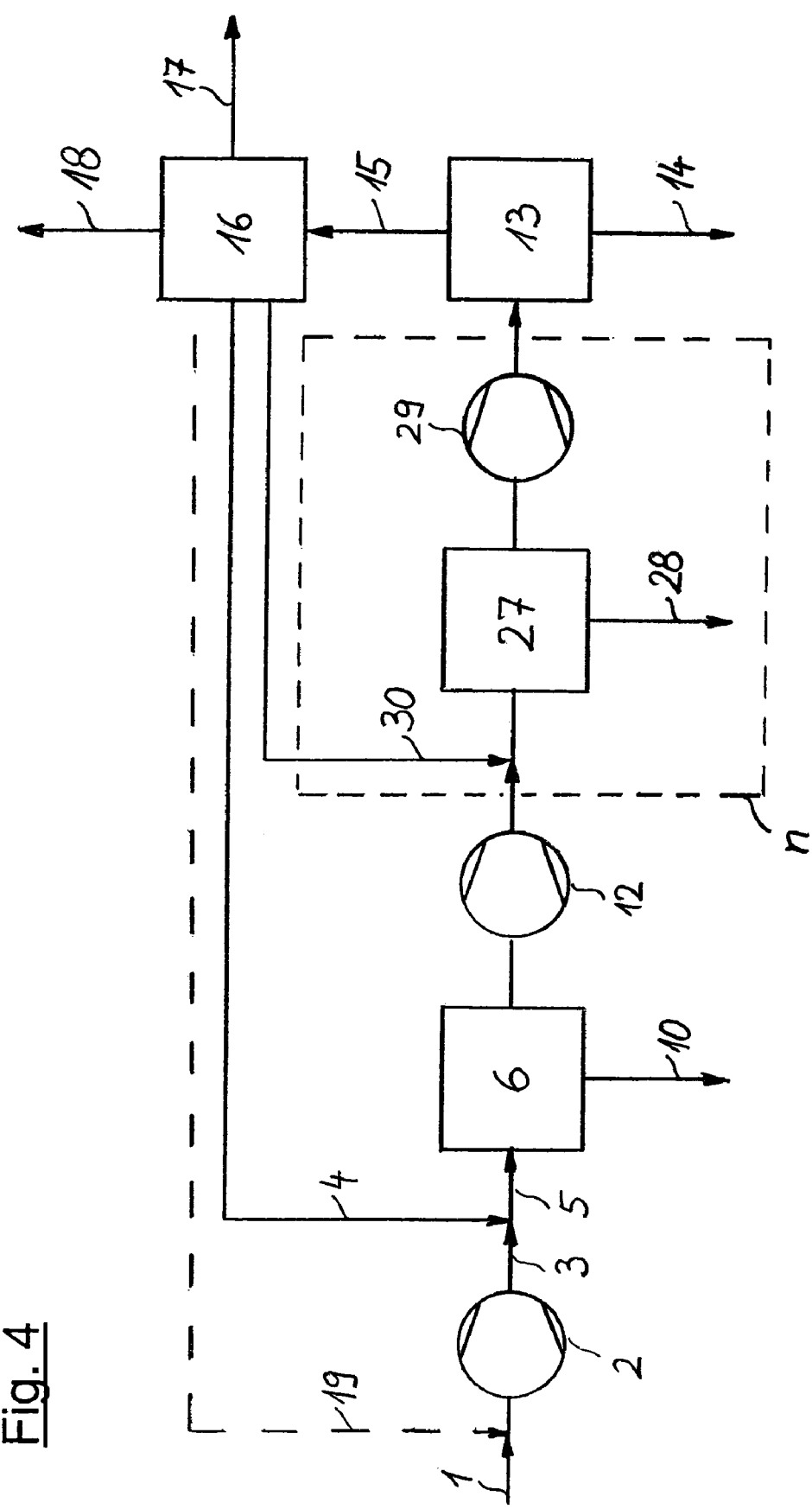
FIG. 4: a typical layout of a plant consisting of several make-up gas synthesis systems and one synthesis loop system.

FIG. 4 illustrates a configuration which provides for several synthesis systems 27 which are located inside a unit shown with broken lines and marked "n" ("n" may be any integer from 1 upwards) and which are successively fed with synthesis gas, with only last synthesis system 13 being operated as a synthesis loop system. All of tied-in synthesis systems 27 produce liquid ammonia 28. They all have a downstream compression stage 29 and recycle streams 30 can optionally be admixed to the synthesis gas used as feedstock.

The invention will now be substantiated in more detail on the basis of two calculation examples. The first calculation example refers to a plant for the production of ammonia in accordance with the invention and is based on a new plant concept. The second calculation example refers to a plant for the production of ammonia in accordance with the invention and is intended for revamping an existing plant. Since the respective criteria for optimising the process depend on a multitude of local conditions for each plant such as climate, feedstock supply, infrastructure etc., the specialist in the field may deviate from the mass stream flow rates indicated in said examples without abandoning the approach of this invention.

The identification numbers shown in the two tables below relate to reference numbers used in the figures described above, in particular FIG. 1, the flow rates being indicated in t/h and the concentrations of the gases in molar %. The production capacity is obtained in each case by totalling the streams 10, 14 and 17.

Calculation example 1: Design of a new plant for a total production capacity of 2,000 tons/day of ammonia.

| Stream No. | Flow rate t/h | Concentration (molar %) | | | |
|---|---|---|---|---|---|
| | | $NH_3$ | $N_2$ | $H_2$ | Inert gas |
| 1 | 96.151 | 0.0 | 27.03 | 71.54 | 1.43 |
| 4 | 5.413 | 0.0 | 9.33 | 90.22 | 0.45 |
| 5 | 101.564 | 0.0 | 25.21 | 73.47 | 1.32 |
| 11 | 78.201 | 3.54 | 24.40 | 70.27 | 1.79 |
| 15 | 19.352 | 5.41 | 24.96 | 61.57 | 8.06 |
| 18 | 12.797 | 0.0 | 64.74 | 7.41 | 27.85 |

| Production balance: | Stream no. | Production [t/h] |
|---|---|---|
| | 10 | 23.363 |
| | 14 | 58.849 |
| | 17 | 1.142 |
| | Total | 83.354 |

Calculation example 2: Design concept for revamping an existing plant the production capacity of which was designed for 1,500 tons/day of ammonia and which uses a conventional high-pressure process, the new production capacity being 1,839 tons/day of ammonia.

| Stream no. | Flow rate t/h | Concentration (molar %) | | | |
|---|---|---|---|---|---|
| | | $NH_3$ | $N_2$ | $H_2$ | Inert gas |
| 1 | 88.903 | 0.0 | 26.92 | 71.88 | 1.20 |
| 4 | 4.030 | 0.0 | 7.05 | 90.34 | 2.61 |
| 5 | 92.933 | 0.0 | 25.21 | 73.46 | 1.33 |

-continued

| 11 | 71.348 | 3.49 | 24.41 | 70.29 | 1.80 |
|---|---|---|---|---|---|
| 15 | 17.030 | 4.90 | 25.20 | 61.55 | 8.35 |
| 18 | 12.276 | 0.0 | 25.30 | 55.57 | 19.13 |

| Production balance: | Stream no. | Production [t/h] |
|---|---|---|
| | 10 | 21.585 |
| | 14 | 54.318 |
| | 17 | 0.724 |
| | Total | 76.627 |

The calculation examples, however, must not be interpreted to the effect that the larger part of the ammonia production should take place in the last reaction system. Depending on the number of successive synthesis systems, it is also possible to produce only a relatively small part of the total ammonia production in the last synthesis system.

| Key to the reference numbers: | |
|---|---|
| 1 | Make-up gas stream |
| 2 | Primary compression stage |
| 3 | Primary-compressed synthesis gas stream |
| 4 | Recycle gas stream |
| 5 | Synthesis gas stream |
| 6 | Primary synthesis system |
| 7 | Make-up gas reactor |
| 8 | Cooling and condensation section |
| 9 | Ammonia separator |
| 10 | Liquid ammonia |
| 11 | Residual synthesis gas stream |
| 12 | Secondary compression unit |
| 13 | Secondary synthesis system |
| 14 | Liquid ammonia |
| 15 | Purge gas stream |
| 16 | Recovery unit |
| 17 | Liquid ammonia |
| 18 | Inert gas removal unit |
| 19 | Recycle stream |
| 20 | Synthesis gas feed point |
| 21 | Recycle compression unit |
| 22 | Ammonia reactor |
| 23 | Cooling and condensation section |
| 23 a,b | Cooling and condensation section (split representation) |
| 24 | Ammonia separation unit |
| 25 | Purge gas withdrawal point |
| 26 | Recycle gas |
| 27 | Synthesis systems |
| 28 | Liquid ammonia |
| 29 | Compression stage |
| 30 | Recycle streams |

The invention claimed is:

1. A process for the production of ammonia from fresh synthesis gas, which contains inert components apart from the reactants hydrogen and nitrogen, takes place in at least two reaction systems which comprise lined-up synthesis systems including a first system and a last system, wherein ammonia is produced from a portion of the synthesis gas in each of the at least two systems with a part stream being withdrawn, and the respective downstream synthesis system operates at a higher pressure than the respective upstream system.

2. A process according to claim 1, wherein the first synthesis system operates as a make-up gas system.

3. A process according to claim 1, wherein all of the at least two synthesis systems operate as make-up gas systems with the exception of the last synthesis system.

4. A process according to claim 1, wherein the last synthesis system operates as a recycle loop system.

5. A process according to claim 1, wherein each synthesis system is separated from the next downstream synthesis system by at least one compression stage.

6. A process according to claim 1, wherein a stream of purge gas withdrawn from a synthesis system with a higher pressure is sent as feedstock to a synthesis system operating at a lower pressure, the inert ingredients, ammonia and various gas ingredients, if any, having been removed before.

7. A process according to claim 6, wherein the flow rate of the purge gas stream is increased such that the enrichment with inert ingredients within the system operated at the highest pressure reaches a maximum value of 10 molar %.

8. A process according to claim 3, wherein at least one of the make-up gas reactors uses catalyst material which contains magnetite with for low-pressure synthesis systems.

9. A process according to claim 3 wherein at least one of the make-up gas reactors uses catalyst material which contains noble metal.

10. A process according to claim 3 wherein catalyst material containing nitrides of sub-group numbers VI and VIII in the periodic table of the elements is used in at least one make-up gas reactor.

* * * * *